United States Patent [19]

Ide

[11] Patent Number: 5,156,443
[45] Date of Patent: Oct. 20, 1992

[54] SEALED ROLLER ASSEMBLY

[76] Inventor: Russell D. Ide, 641 Arnold Rd., Coventry, R.I. 02816

[21] Appl. No.: 756,053

[22] Filed: Sep. 6, 1991

Related U.S. Application Data

[63] Continuation-in-part of Ser. No. 593,956, Oct. 9, 1990, abandoned.

[51] Int. Cl.⁵ ............................................. B60B 19/00
[52] U.S. Cl. ........................................ 301/1; 198/501; 384/58; 16/45; 16/107
[58] Field of Search ................... 301/1, 5.7; 305/7, 19; 384/13, 16, 58; 16/18 R, 45, 46, 107; 198/501

[56] References Cited

U.S. PATENT DOCUMENTS

| | | | |
|---|---|---|---|
| 2,912,288 | 11/1959 | Griswold, Jr. | 384/58 X |
| 3,185,531 | 5/1965 | Wodrey | 384/13 |
| 4,306,756 | 12/1981 | Whiting | 16/107 X |
| 4,359,945 | 11/1982 | Brems et al. | 198/465.4 X |
| 4,384,387 | 5/1983 | Pachuta | 16/107 |
| 4,722,115 | 2/1988 | Yang | 16/45 |

Primary Examiner—Russell D. Stormer
Attorney, Agent, or Firm—Marks & Murase

[57] ABSTRACT

A lubricated roller assembly which can be constructed entirely of non-metallic components. The roller assembly includes a shaft and roller body secured to one another and enclosed by a housing. The roller body is adapted to roll against an inner peripheral surface of the housing. A supply of lubricant sufficient to lubricate the roller body is contained within the housing. A lubricant containment reservoir is formed in either the housing or the shaft such that regardless of the orientation of the roller assembly, lubricant will not reach the interface between the shaft and the housing. The roller body may be provided with a drip edge to further direct lubricant away from the interface between the housing and the shaft.

32 Claims, 8 Drawing Sheets

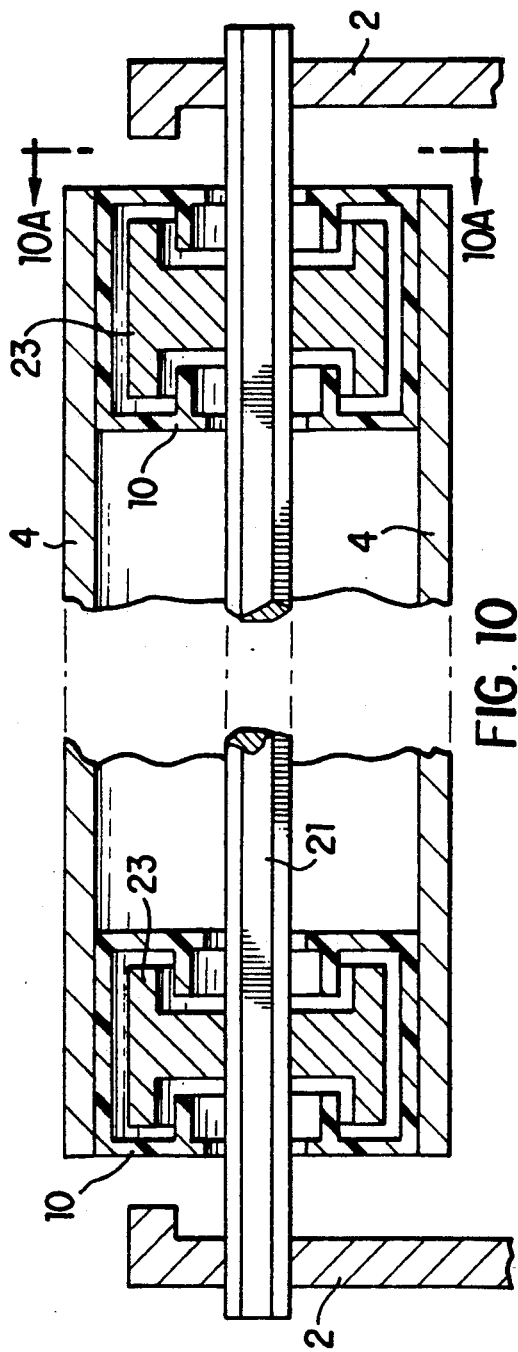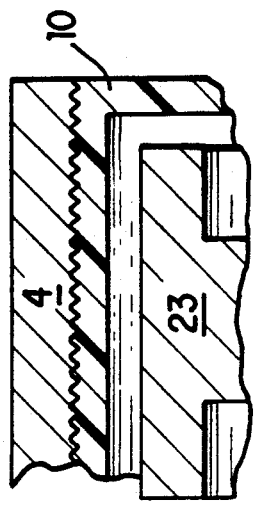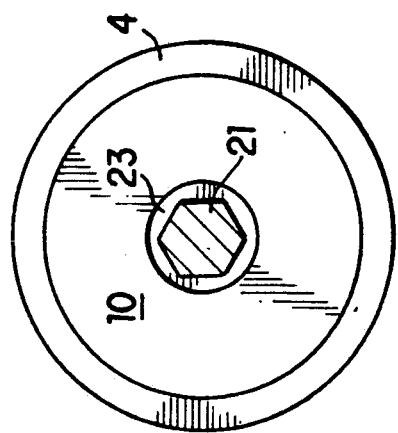

SEALED ROLLER ASSEMBLY

This application is a continuation-in-part of U.S. application Ser. No. 07/593,956 entitled "Sealed Roller Assembly" which was filed on Oct. 9, 1990 and is now abandoned

FIELD OF THE INVENTION

The present invention relates to roller assemblies which include a, preferably cylindrical, housing rotatably supported on a shaft. The present invention is particularly directed to roller assemblies used in applications in which the horizontal orientation of the roller assembly remains substantially unchanged during normal use.

BACKGROUND OF THE INVENTION

Roller assemblies typically include at least two parts which are rotatable relative to one another and some form of bearing supporting the two parts on one another.

Roller assemblies are used in a wide variety of applications. Among the most common applications are those in which the roller assembly is used to provide a rolling path. In a typical rolling path or roller conveyor system, an appropriately spaced series of hundreds of more roller assemblies is used to provide a rolling path or track for goods during assembly, manufacture, or processing. Some such applications require miles of conveyor paths and millions of roller assemblies. Roller assemblies are also commonly used as a wheel. One example of a roller assembly used as a wheel supporting a load for movement is an overhead conveyor system wherein the load is hung from a bracket which is typically rollingly supported by two rollers on opposite ends of an I-beam. Roller assemblies are also used as wheels in carts, tilt trucks and the like.

In the past, the most common form of roller assembly has consisted of a metal shaft supporting a roller bearing which in turn supports a metal, plastic or rubber wheel. A number of problems have been experienced with this conventional roller assembly. Among other things, the conventional assembly wears too quickly, can seize up and break, is relatively expensive and can be quite noisy. These problems all result, at least partially, from the use of a roller bearing in the assembly. The roller bearing is easily the most expensive component of the system. Unless an extremely precise (and expensive) roller bearing is used, the bearing is likely to be noisy. Moreover, even the best roller bearings wear relatively quickly. Excessive wear of the metal can, of course, lead to failure. Also, in many assemblies the material that wears off is the zinc plating which protects the steel shaft from corrosion. The use of roller bearings also complicates the assembly of the roller assembly because it is necessary to secure the roller bearing to both the shaft and the housing member.

Another disadvantage associated with conventional roller bearing type roller assemblies is that the assemblies almost always include metal bearings lubricated with a grease or oil. The use of the metal and grease or oil presents problems in applications where the roller assembly is likely to be subjected to corrosive materials or in food processing facilities where a premium is placed on sanitation.

One attempt to overcome the disadvantages associated with roller bearing type rollers and provide an improved roller is the so called all-plastic roller. One known example uses a self-lubricating plastic such as nylon reinforced with an aramid fiber to increase the stiffness and load bearing capability of the plastic. The relatively movable shaft and housing are in direct contact with one another and no lubricant is provided.

Because of the use of high performance engineering plastics, it was expected that this all-plastic dry roller assembly would offer longer life and reduced maintenance compared to greased metal rollers. However, in practice a number of problems have arisen. For instance, the coefficient of friction in the dry system is too high; this results in excessive power requirements to drive the roller assembly. Finally, without lubricant, the plastic wears too quickly thus limiting the life of the roller assembly. Finally, the plastics have a limited load capability.

Heretofore, there has been a reluctance to attempt to use lubrication in an all-plastic roller assembly or in an assembly having an all plastic housing because of the difficulty of sealing the lubricant within the all-plastic assembly. It was thought that proper sealing would require a complex seal assembly thus increasing the cost of the overall roller assembly. Moreover, there has been no practical way to ensure the integrity of the seal as is required in certain applications such as food processing. In large part, the reluctance to use lubricant results from the recognition that it is extremely difficult, if at all possible, to seal between two relatively movable surfaces when the interface of the two relatively moving surfaces is acting as a fluid dam.

The significance of the above described problems with known roller assemblies can be appreciated when one considers that a large manufacturing or food processing facility can easily include millions of roller assemblies. If the roller assemblies wear too quickly, it becomes necessary to replace each of the millions of roller assemblies. This can cause manufacturing delays and is, of course, very expensive. Moreover, when a single application uses millions of roller assemblies, even a small decrease in the cost of each assembly can drastically reduce the overall cost of a conveyor system. Likewise, any reduction in the cost and time required to assemble individual rollers and conveyor systems using such rollers can be very significant. Further, any noise generated by each individual roller is greatly magnified when millions of roller are used in a single facility.

Thus, there remains a need for a roller assembly which is inexpensive, durable, leak proof, non-corrosive and quiet.

SUMMARY OF THE INVENTION

The present invention provides a roller assembly which can be used to support a conveyor-type roller, or as a wheel for use in an overhead conveyor system or a cart or the like. The assembly is inexpensive, durable, quiet, non-corrosive and leak proof.

The roller assembly of the present invention includes at least one shaft, a roller body secured to the shaft and a housing surrounding the roller body and including an opening for receiving each of the one or more shafts. A predetermined amount of a lubricant, preferably a light oil (spindle oil, transmission fluid, etc.), is contained within the housing such that when the roller assembly is oriented in its normal position (with the shaft extending horizontally), the lubricant lubricates the roller body for rotation with the cylindrical interior of the housing.

This lubrication reduces the coefficient of friction of the roller body relative to the housing from 0.1 to 0.04 or less (at least 2.5 times less friction) thus significantly reducing wear and extending life.

Since the roller assembly is maintained in the same horizontal configuration for the duration of its life, the housing can provide a complete seal for retaining the lubricant within the housing. The housing includes a contact seal formed integrally therewith along the periphery of each of the shaft receiving openings to inhibit fluid flow between the housing and the shaft. The contact seal also acts to prevent or limit the entry of dust and other contaminants into the sealed interior of the assembly. The housing further includes a containment reservoir designed to contain lubricant such that regardless of the orientation of the roller assembly, lubricant does not collect at the contact seal point.

The housing may include a cylindrical sleeve extending into the housing from the shaft receiving opening. The sleeve is spaced from and surrounds the shaft to define an annular containment reservoir surrounding the shaft and being located axially adjacent the roller body on the side of the roller body that is connected to the shaft. The contact seal is formed at the axial end of the sleeve opposite the shaft receiving opening. Thus, in the event the roller assembly is displaced from its normal orientation, the lubricant will be retained either within a closed axial end of the housing or within a containment reservoir at the open end of the housing or, in accordance with one embodiment, in a bore formed in the interior of the shaft itself. Thus, the bulk of the lubricant will never come in contact with the interface of the contact seal and the rolling body or shaft. The contact seal will only have to prevent leakage of the occasional drops which slide past the interface.

The seal may be a simple lip seal directly contacting the shaft or a progressive seal having portions contacting both the roller body and the shaft.

In accordance with another aspect of the present invention, the seal can be part of a shingle-type structure. The shingle-type structure is provided in conjunction with an embodiment wherein the roller body is provided with an annular axially extending protrusion such that any lubricant which clings to the periphery of the roller body and is carried up to the top of the roller assembly is deflected axially away from the roller body by the annular protrusion. The seal formed integrally with the housing includes a portion which extends radially outward and axially under the annular protrusion such that the lubricant directed away from the roller body flows into the containment reservoir and is prevented by the shingle structure, from coming into contact with the seal of the housing. When, as discussed below, the annular projection and the shingle are properly inclined there is virtually no chance that lubricant will come into contact with the interface of the housing and contact seal point. Further, if desired, the radially extending portion of the seal can be extended to contact the lower edge of the annular projection so as to eliminate the need for a separate housing to shaft contact seal.

As an alternative, the lubricant containment reservoir may be formed in the shaft rather than the housing. In such a case, the shaft would be formed with an axial bore and passages providing communication between the bore and the interior of the housing. The housing could be provided with a simple contact seal at the periphery of the shaft receiving opening to guide lubricant into the passages.

The assembly of the present invention may be formed as a modular unit for ready assembly into a variety of applications. For instance, the shaft may be formed either integrally or separate from the roller body. In a modular assembly, the shaft could be formed separately such that a complete module including the roller body, lubricant and housing could be used in connection with various shafts. Any known form of shaft-to-roller body connection could be used. For instance, the shaft could be threaded into the roller body to provide a detachable connection as might be desirable in, for example, an application in which the housing functions as a wheel. On the other hand, if, because of the durability of the roller assembly of the present invention, it is not anticipated that the shaft and roller body will have to become separated during the life of the roller assembly, the module could include a snap-type connection between the shaft and the roller body.

In another form of modular assembly, the shaft and roller body are formed integrally but the shaft is a stub type shaft adapted to be connected to another shaft or body member. The stub shaft end can be provided with any type of releasable or permanent connecting means. However, a snap type connection as suggested by the present invention appears to be particularly appropriate.

The roller assembly also may be constructed with shafts extending out of both axial ends of the assembly. This, might be desirable, for example, in a cart or track-type system utilizing a single wheel.

The roller assembly of the present invention has a wide variety of applications. Generally, the roller body 23 of the assembly should roll along the lower portion of the interior surface of the housing where lubricant 30 collects. In some applications, however, the centrifugal action of the rotating housing will distribute lubricant along the entire interior surface so that the roller body can contact the interior surface of the housing at any point. With this in mind, the roller assembly of the present invention is adaptable to both overhead and roller-type conveyors and is well suited for use as the wheels in an inexpensive low r.p.m. wheeled carts such as a hand cart, shopping cart or tilt-truck.

Alternatively, the roller body may be formed of a metal such as steel to improve durability and wear characteristics. The housing could also be formed of metal. At present, the most preferred construction includes a housing formed of an engineering plastic and a roller body formed of steel.

The roller assembly of the present invention can be constructed entirely of non-metallic, non-corrosive materials. Engineering plastic materials, preferably high performance plastic materials such as acetal with an additive such as TEFLON graphite, molybdenum disulfide sold by DUPONT TM under the name DELRIN TM and a light oil such as spindle oil transmission fluid and the like are ideal.

The housing is preferably formed by blow molding or injection molding two housing halves. If the roller body and shaft are formed of plastic they are also formed by blow molding or injection molding either integrally or separately as discussed above. The shaft and roller body members, if formed separately, are then joined and the roller body is placed within one of the housing members. The second housing member is then connected to the first housing member to form a complete enclosure.

The lubricating oil is then injected into the enclosed housing either through a preformed lubehole or by inserting a cannula through the housing. After the appropriate amount of lubricating oil is inserted in the housing, the hole in the housing is filled to provide a sealed roller assembly.

BRIEF DESCRIPTION OF THE DRAWINGS

FIG. 10 shows another roller-type conveyor arrangement using the roller assembly of the present invention;

FIG. 10A is an end view along the lines indicated in FIG. 10;

FIG. 10B is a detail view showing a roller assembly having a serrated outer periphery;

DETAILED DESCRIPTION OF THE DRAWINGS

Figure 1A:
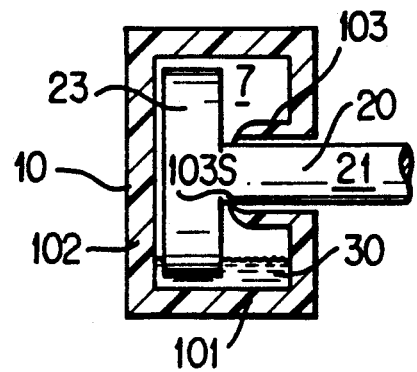
FIG. 1A is a schematic cross-sectional representation of a roller assembly according to the present invention in its normal orientation i.e., with the shaft extending horizontally.
Figure 1B:
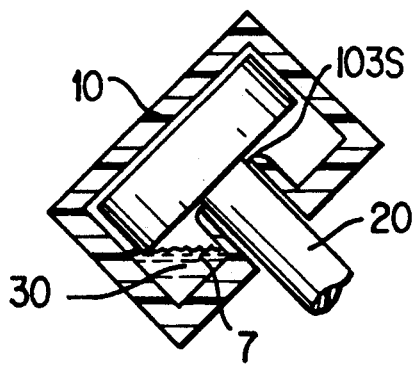
FIG. 1B shows the roller assembly of FIG. 1A with the shaft tilted about 45° down.
Figure 1C:
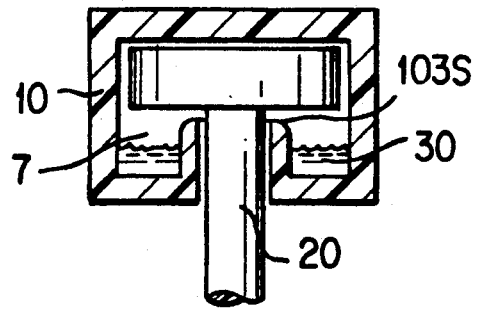
FIG. 1C shows the roller assembly of FIG. 1A with the shaft tilted 90° down.

FIGS. 1A-1C illustrate the basic principle of the roller assembly of the present invention. The roller assembly includes a roller body and shaft assembly 20, a housing 10 and a predetermined amount of liquid lubricant 30. The roller body and shaft assembly includes a roller body 23 having a cylindrical outer periphery and a cylindrical shaft portion 21 coaxial with the roller body 23 and extending from at least one axial end thereof. The housing 10 has a generally cylindrical exterior shape (unless the exterior is provided with threads, splines, serrations, locking or snap projections, spring mounted projections or treads to accommodate a specific use, as discussed below) including a cylindrical outer peripheral wall 101 and two circular axial end walls 102. The outer peripheral wall 101 has a cylindrical interior surface on which the roller body 23 rolls. The shaft portion 21 of the roller body and shaft assembly 20 extends through at least one of the axial end walls 102.

In the example illustrated, the housing 10 is formed with a radially inner sleeve 103 extending axially from the end wall 102 toward the roller body 23 and spaced from and surrounding shaft portion 21. The axial end of the sleeve 103 closest to the roller body 23 is formed as a contact seal to provide sealing contact between a housing 10 and the shaft portion 21. This sealing contact inhibits entry of dust and other contaminants into the assembly and inhibits lubricant flow out of the assembly. The sleeve 103 defines the radially inner boundary of an annular lubricant containment reservoir 7 defined by the outer periphery of the sleeve 103, an axial end wall 102 and a portion of the inner surface of the outer peripheral wall 101. The sleeve is not necessary if the containment reservoir is formed in the shaft portion 21, as discussed below. A supply of lubricant 30 is located within the housing 10. The lubricant is preferably a light oil such as spindle oil or transmission fluid.

In FIG. 1A and all the other figures of drawings, the roller assembly is depicted with a space between the lower edge of the roller body 23 and the inner surface of the peripheral wall 101 against which the roller body rolls. The size of this space is greatly exaggerated to clearly illustrate the presence of lubricant at the contact point. In reality, the lubricant film at the lowest most point of the roller assembly is very thin; in effect, the roller body 23 slides on the inner surface of the wall 101 of the housing 10.

In some of the applications for which the roller assembly of the present invention is intended, the roller assembly will generally have a constant or stable horizontal orientation. FIG. 1A depicts the roller assembly in its normal orientation—with the shaft portion extending horizontally, i.e., parallel to the plane tangent to the earth's surface at an observer's position. The roller assembly will be horizontally oriented regardless of whether the roller assembly is used in a roller conveyor, as the guide wheels in an overhead conveyor or as the wheels on a cart. It can be readily appreciated from FIG. 1A that in this, normal position, there is little if any chance that lubricant 30 will escape the housing 10. Even if a small amount of lubricant 30 is dragged to the top of the housing by the rolling body 23, it will fall back into the bottom of the housing without escaping from the interior of the housing because of the contact seal 103S at the axial end of the sleeve 103. Thus, so long as the roller assembly is maintained in its normal horizontal orientation, i.e., the orientation shown in FIG. 1A, there is little chance that lubricant will escape from the interior of the housing.

Although the roller assembly of the present invention is intended for applications in which the orientation of the roller assembly is stable there will be times when the roller assembly is displaced from the orientation indicated in FIG. 1A. For instance, during transport and assembly and occasionally in certain uses (as in carts), the roller assembly will be disturbed from its normal orientation. Thus, in order to insure that the roller assembly is useful in a wide variety of applications, the roller assembly must also be fluid-tight when the assembly is not in its normal position.

With reference to FIG. 1A, if the roller assembly is tipped onto the axial end 102 opposite the shaft 21, there is no possibility of leakage since that axial wall 102 and the peripheral wall 101 form a fluid-tight container. However, at the other axial end where the shaft 21 extends through the axial wall 102 at the inner edge of the sleeve 103 it would be difficult, if not impossible, with the simple integrally formed seal at the end of sleeve 103 to ensure that fluid would not leak between the seal 103S and the shaft 21. This is because it is extremely difficult, if at all possible, to provide a perfect seal between two relatively moving surfaces with a simple contact seal when a supply of lubricant collects at the interface of the seal and the surface moving relative to it. In accordance with the present invention, however, the provision of the lubricant containment reservoir 7 ensures that lubricant will not collect at the seal interface and that the bulk of the lubricant 30 will never come into contact with the sealing edge 103S of the sleeve 103 and the shaft portion 21. Thus, it is only necessary to seal against drops which momentarily contact the interface on rare occasions; a contact seal is believed adequate for this purpose.

More specifically, with reference to FIGS. 1B and 1C, as the roller assembly is tipped down onto the end through which the shaft portion 21 passes, the lubricant 30 is retained within the containment reservoir 7 and never even approaches the sealing point 103S. Thus, the roller assembly is designed such that the bulk of the lubricant 30 is never in the vicinity of the region in which lubricant might escape, i.e., the interface between the sealing point 103S of the housing 10 and the shaft portion 21 which extends into the housing 10.

By virtue of this construction, lubricant can be provided to greatly reduce the coefficient of friction between the rolling body 23 and the peripheral wall 101. Specifically, the presence of lubricant reduces the frictional coefficient by at least a factor of 2.5 (from about 0.1 to below 0.04 in one example). This, of course, significantly reduces wear thus extending the life of the roller assembly. The presence of lubricant also reduces the noise generated by the roller.

The basic principle discussed above and illustrated by FIGS. 1A-1C can be extended to numerous specific applications using various forms of the general assembly. To illustrate various features which can be incorporated in actual embodiments of the basic roller assembly, these features are discussed hereinafter with reference to several specific embodiments. Generally, the specific features discussed herein with respect to one illustrative embodiment are easily combinable with other features described with reference to other embodiments. Thus, the housing and roller body shape of FIG. 2 can be used with a separate shaft and roller body construction as illustrated in FIG. 3 and/or with a stub-shaft assembly shown in FIG. 4 or a dual shaft arrangement as shown in FIG. 5. Also, as mentioned earlier, in each illustration the space between the roller body 23 and the interior of the housing 10 is greatly exaggerated. In reality, the space is quite small in that the roller body 23 slides on the interior of the housing on a thin film of lubricant.

Figure 2:
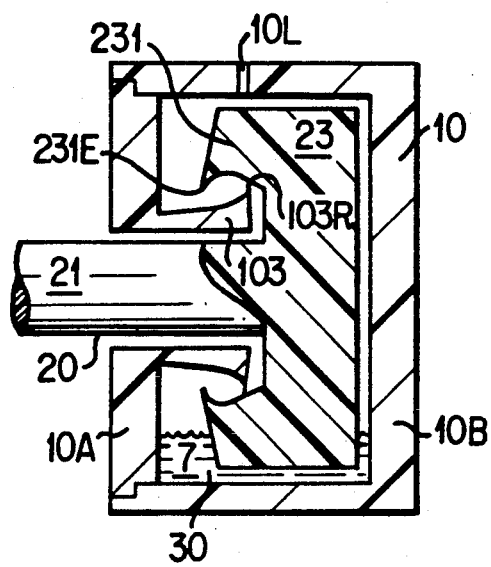
FIG. 2 is a cross-sectional view showing a first embodiment of the roller assembly of the present invention.
Figure 3:
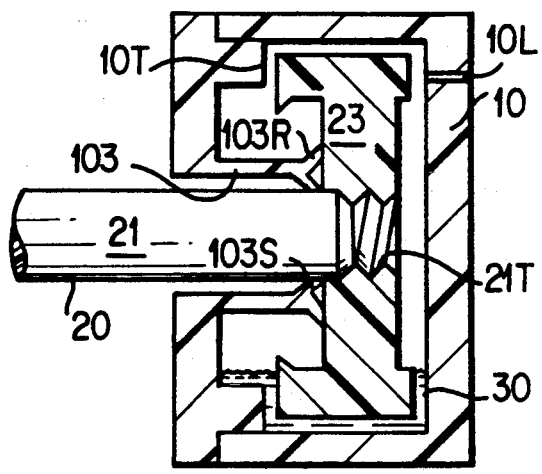
FIG. 3 is a cross-sectional view showing a second embodiment of the roller assembly of the present invention.

FIG. 2 is a cross-sectional side view of a roller assembly according to the present invention. As shown, the roller assembly includes a housing 10, a shaft and roller body assembly 20 which includes a roller body 23 which slides inside the housing 10 and a shaft portion 21 extending out of the housing 10. Although shown as integral, the shaft 21 and roller body 23 could be formed separately, as discussed below. A supply of lubricant 30 is provided within the housing 10 to lubricate the roller body 23 as it slides within the housing 10. It should be noted that the term "slides" is used herein to describe relative motion between the housing 10 and the roller body 23. In certain cases, it is the housing 10 which actually turns while the roller body 23 remains substantially stationary; this is the case when the roller assembly is used as a wheel and when the housing supports a rotatable member such as in certain conveyor systems.

Figure 7:
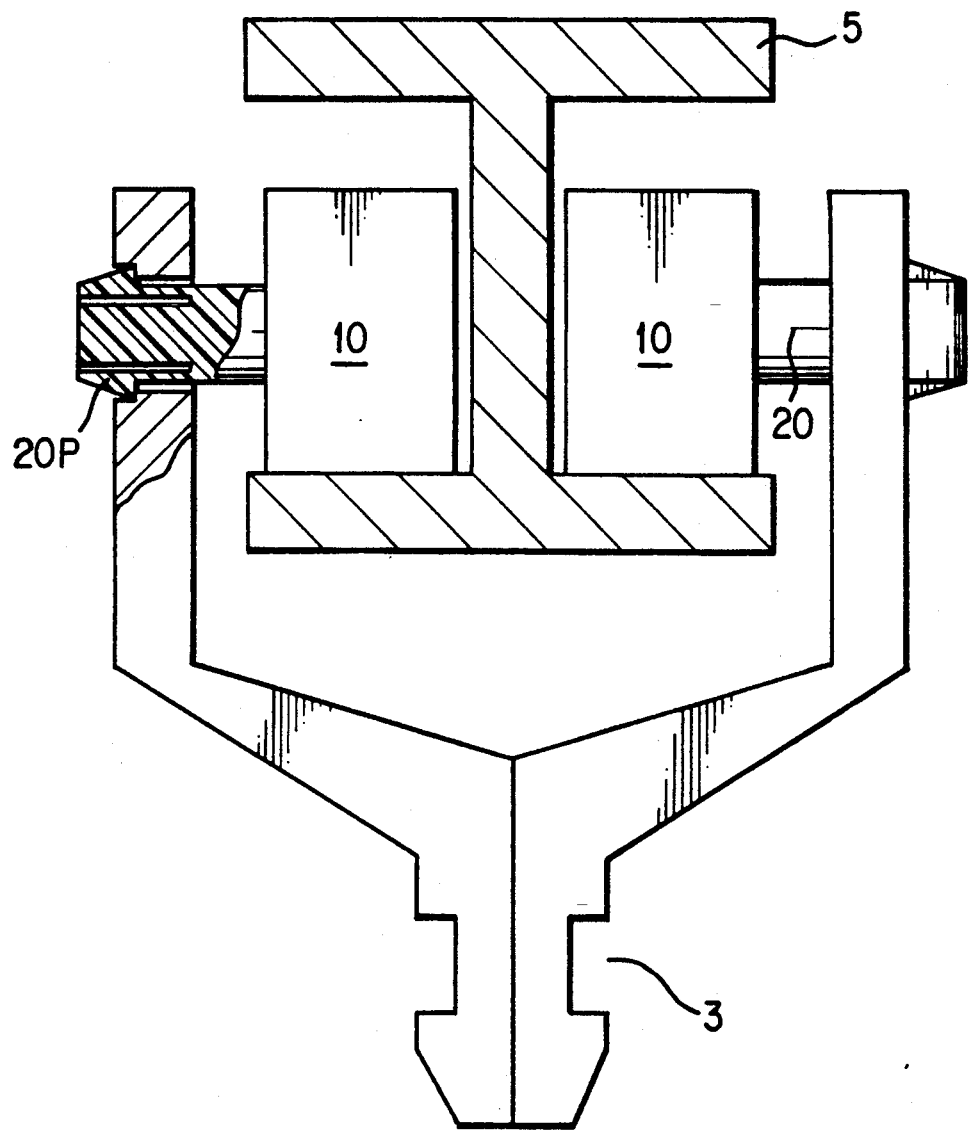
FIG. 7 illustrates the use of a roller assembly according to the present invention in an overhead I-beam conveyor system.

The housing 10 includes an axially extending sleeve 103. The sleeve 103 surrounds and is spaced from the shaft portion 21 at its inner radial edge and is spaced from the inner surface of the outer peripheral housing wall at its outer surface to define a containment reservoir 7 in the manner discussed above. In this embodiment, the roller body 23 further includes a tapered annular protrusion 231 which tapers to a radially inner point or drip edge 231E. The axial sleeve 103 includes a radially outward extending edge 103R which, in the assembled state shown in FIG. 2, contacts an edge of the annular protrusion 231. By virtue of this construction and the inclined shape of the roller body 23 and sleeve 103 as shown in FIG. 2, any small amount of lubricant which is dragged by the roller body to the upper portion of the housing 10 is directed by the taper of the annular protrusion 231 axially into the containment reservoir 7 and back to the bottom of the housing as shown in FIG. 7. Also, because the drip edge 231E overhangs the radial extension 103R and because of the downward slope of the sleeve 103, there is no possibility for lubricant to flow to the interface between the sleeve 103 and the roller body 23. Finally, because of the contact between the radial extension 103R of the sleeve 103 and the protrusion 231 of the roller body 23, a contact seal is provided between the housing 10 and the shaft and roller body member assembly 20 such that in the unlikely event (such as by vigorously shaking the roller assembly), that lubricant were to reach the interface of the radial extension 103R and the annular protrusion 231, the lubricant would be prevented from leaving the housing 10. The contact seal also inhibits the entry of dust and other contaminants into the assembly.

As shown in FIG. 2, the housing 10 is normally split to enable easy molding of the housing per se and to simplify assembly of the roller assembly. In the case of the assembly shown in FIG. 2, the housing 10 is split into separate portions 10A and 10B each of which is easily moldable, i.e., can be molded in a simple mold without the need for displaceable cams or the like. If desired, the pieces could also be blow molded. In the case of a split housing, the housing portions 10A and 10B are joined together by any known means such as, for example, sonic welding or an adhesive, such that once joined together, the separate formation of these parts does not affect the fluid tightness of the housing. Some form of split housing construction is preferably employed in each of the roller assemblies described herein.

FIG. 3 illustrates another roller assembly according to the present invention. In this embodiment, the shaft portion 21 is formed separate from the roller body 23 and the two are joined by a connecting means comprising complementary connectors formed on the two members to be joined. In the illustrated embodiment, the connecting means includes a thread 21T formed on the shaft and a complementary thread in the roller body; the shaft portion 21 can then be threaded into the roller body 23. Without more, this would provide a releasable connection between the shaft portion 21 and the roller member 23. The connection could be made non-releasable through the provision of an adhesive or some form of thread which prevents the shaft from being threaded out of the roller body 23 after initial assembly. Naturally, any suitable form of connector could be used. For instance, the snap-type connector shown in FIGS. 4, 6 and 6A could be used. Other types of connectors such as keylock or rivet type connectors could also be used.

The roller member 23 of the embodiment of FIG. 3 also includes an annular protrusion 231 which includes a drip edge 231E. However, this roller body member 23 does not include the gradually tapered surface of the previously described embodiment. The axial sleeve 103 of the embodiment of FIG. 3 includes both a radially extending portion 103R and a sealing lip 103S integrally molded with the axial sleeve 103. As with the previously described embodiment, the drip edge 231E of the annular protrusion 231 overhangs the radially extending portion 103R to provide a shingling effect which eliminates the possibility of lubricant flowing to the interface of the housing 10 and the shaft and roller body assembly 20.

In the embodiment of FIG. 3, the housing also includes a radially inward extending thrust face 10T adapted to contact a side edge of the roller body 23 for the purpose of supporting thrust forces. The opposite axial edge of the roller body 23 includes an annular lip which can contact the inner side of the axial end of the housing 10 to provide similar thrust support. Again, both the radial and axial space between the housing 10 and the roller body 23 are greatly exaggerated for purposes of illustration. In reality, the roller body 23 is separated from the housing only by a thin film of lubricant at the lower most peripheral edge of the housing 10 and at least one of the axial edges of the housing 10.

The releasable connection between the shaft portion 21 and roller member 23, as shown in FIG. 3, is only useful in applications in which either the housing 10 or the shaft portion 21 (or some member connected to it) would wear more quickly than the other portion. This could be the case if the housing 10 functions as a wheel for a cart or tilt-truck. In such cases it might be desirable to be able to remove the housing or wheel and replace it without discarding the entire shaft assembly. However, under normal circumstances, it is expected that the roller assembly will have an extremely long life such that it would generally not be necessary to provide a releasable connection.

Figure 4:
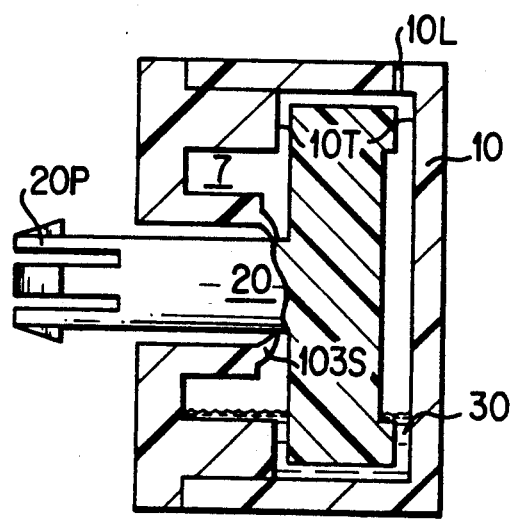
FIG. 4 is a cross-sectional view showing a third embodiment of the roller assembly of the present invention.
Figure 5:
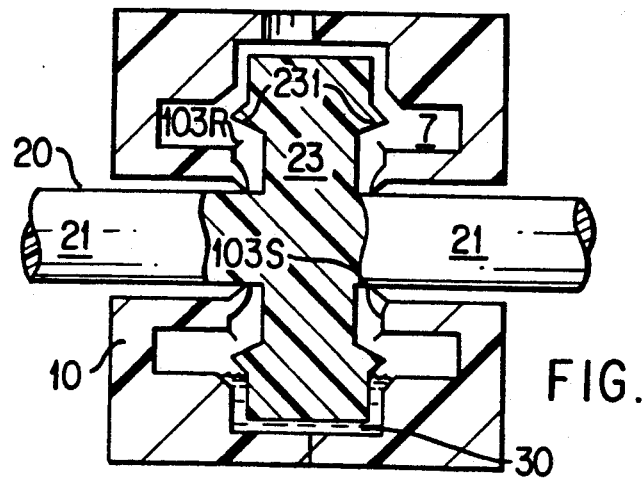
FIG. 5 is a cross-sectional view showing a fourth embodiment of the present invention, in which shafts extend from both axial ends of the roller assembly.

FIG. 4 illustrates another roller assembly according to the present invention. In this embodiment, the shaft portion 21 and roller member 23 are shown as formed integrally. However, unless the housing is formed in several portions, the shaft portion 21 and roller member 23 would generally be formed separately, as discussed herein, to simplify assembly. The shaft portion 21 is, in effect, a stub shaft which extends just slightly out of the housing 10 and is formed with a snap connector 20P which allows the stub shaft 21 to be rotatably secured to any other shaft or a fixed support having a complementary connector formed therein. Although, a simple snap-type connector is shown, any known connection such as threads as shown above, could be employed. As shown, the housing 10 includes a thrust face such that the roller body 23 can contact either axial end of the housing for support of thrust forces. The axial sleeve 103 includes a simple lip seal 103S. Naturally, a more elaborate seal such as a progressive seal or a shingle type overhanging construction could be employed, if desired.

The roller assembly of FIG. 4 also illustrates the possibility of a modular type unit which can be simply snapped into place for various applications. For instance, if the roller assembly were to be used to support the rolls of a roll-type conveyor, the rolls could be simply snapped onto the ends of the stub shaft 21 and the housing 10 could be fixed to a support. On the other hand, if the roller assembly were to be used in an overhead I-beam type conveyor, the stub shaft 21 could be fixed to the mounting bracket and the housing 10 could be allowed to roll along the I-beam. If the roller assembly were to be used in a cart or tilt-truck, the stub shaft 21 could be simply inserted into the axle or body of the cart or truck and the roller housing 10 could function as a wheel. Thus, it can be seen that such a roller assembly offers numerous possible uses.

FIG. 5 illustrates another embodiment of the present invention. This embodiment is generally similar to the embodiment shown in FIG. 3 except that the elements have slightly different shapes and a shaft 21 extends from both axial ends of the housing 10. As can be appreciated with reference to FIG. 5, the provision of shafts extending from each axial end of the assembly does not hinder the lubricant retaining effect of the assembly so long as a lubricant containment reservoir 7 is provided at each axial end of the housing 10. A double shaft assembly of the type shown in FIG. 5 could be used as a single wheel in a cart or truck or as an intermediate support for roll type conveyors at each end of the housing 10.

Figure 6:
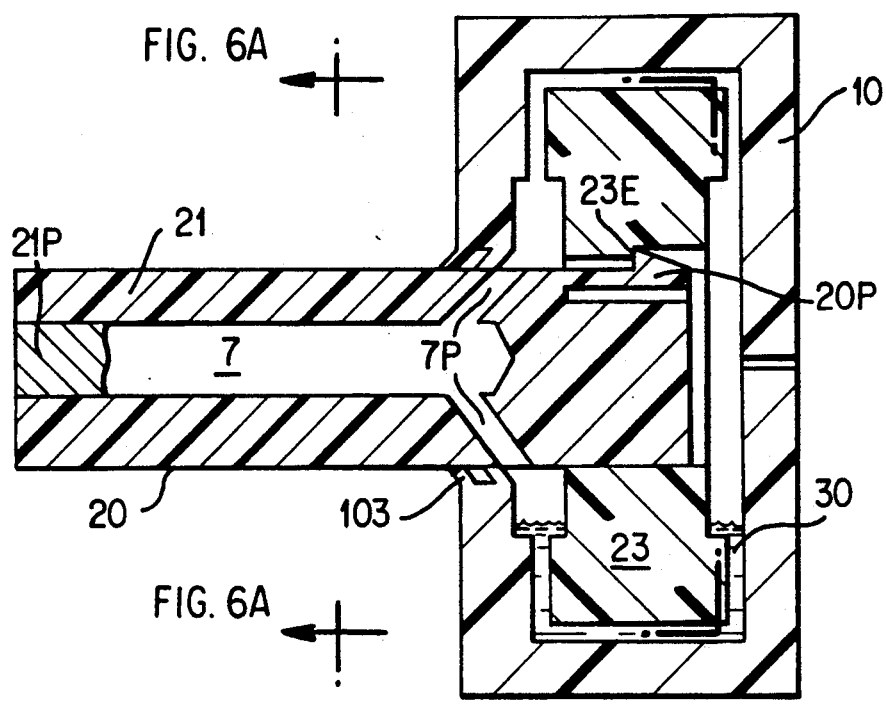
FIG. 6 is a cross-sectional view showing a fifth embodiment of the present invention in which the oil containment reservoir is formed in the shaft.

FIG. 6 shows an embodiment of the present invention in which the lubricant containment reservoir 7 is formed in the shaft portion 21 of the shaft and roller assembly 20. In the illustrated embodiment, the reservoir 7 is formed as a central bore in the shaft portion 21. A plurality of circumferentially spaced ports 7P provide fluid communication between the interior of the housing 10 and the reservoir 7. As shown in FIG. 6, the supports can be angled to cause the flow of fluid into the reservoir when the roller assembly is displaced from its normal position and to cause lubricant to flow out of the reservoir 7 when the roller assembly is in its normal position as shown in FIG. 6. A seal such as a progressive seal or lip seal integrally formed with the housing 10 is arranged just axially outward of the ports 7P such that any fluid approaching the interface of the shaft 21 in the housing 10 flows into the port 7P rather than against the seal 103 and out of the housing 10. This embodiment also includes thrust faces at each end of the housing and the roller body 23 so that thrust forces can be absorbed.

The shaft portion 21 and roller member 23 may be formed integrally. However, in the illustrated embodiment, the members are formed separately and connected to one another by a non-releasable snap-type connection according to the present invention. The snap connection includes locking pawls 20P formed at one end of the shaft 21. The pawls 20P are sufficiently flexible in the radial direction to allow their insertion into grooves 23G formed in the inner periphery of the roller member 23. The roller member 23 is further formed with a locking edge 23E such that when the pawl slides in the groove 23G past the edge 23E, it snaps into place non-releasably and rotatably securing the roller body 23 to the shaft portion 21.

Figure 6A:
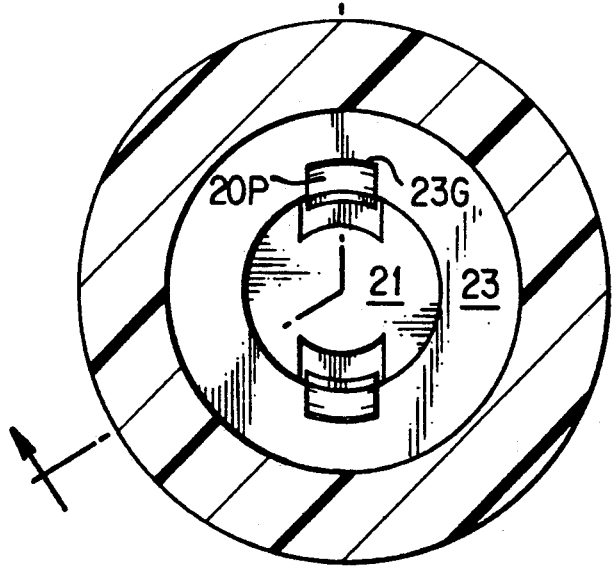
FIG. 6A is a cross-sectional detail view along the lines indicated in FIG. 6.

As shown in FIG. 6A, the locking assembly of the illustrated embodiment includes two locking pawls to insure a tight connection between the members. Naturally, variations of the snap-type connection can be employed. Moreover, the snap type connection can also be used in any of the other embodiments disclosed herein, if desired.

There are, of course, many ways to form the central bore defining the containment reservoir 7 in the shaft portion 21. In the illustrated embodiment, because one axial end of the shaft portion 21 functions as part of the snap connection, the containment reservoir 7 is formed by providing a longitudinal bore in the opposite end of the shaft portion 21 and plugging an axial end of the bore with a plug 21P (preferably of some type of plastic) so as to define a chamber. As indicated above, the ports 7P are provided or formed so as to allow fluid communication between the exterior of the shaft portion 21 and the interior of the chamber or reservoir 7.

FIGS. 7-10 illustrate several applications for the roller assembly of the present invention. Because of the construction of the roller assembly of the present invention, as described above, it is preferable that when used in any application, the shaft 21 and the roller body 23 connected thereto contact the lower end of the interior of the housing 10 where lubricant collects to insure proper rolling.

In the embodiment of FIG. 7, a roller assembly according to the present invention is used in a overhead conveyor in which two rollers are connected to each of a plurality of brackets 3 (only one of which is shown) to allow the brackets to roll along an I-beam 5 via the roller assemblies of the present invention. In the illustrated embodiment, the roller assemblies are formed with a stub shaft portion 21 which is simply snapped into the bracket 3 as shown in FIG. 7. Naturally, other forms of connection are possible.

Figure 8:
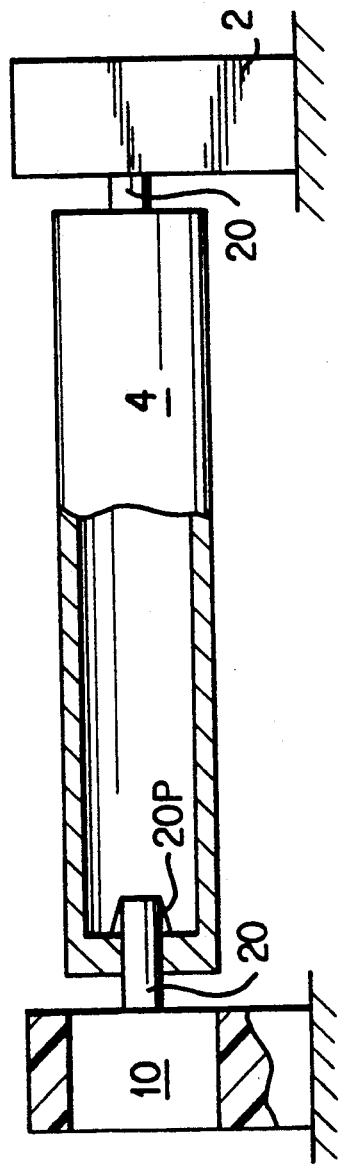
FIG. 8 shows a roller assembly according to the present invention used in a roller-type conveyor arrangement.

FIG. 8 shows an example of the roller assemblies of the present invention used to support a roll-type conveyor roll 4 rotatably. In this case, the roll 4 is secured to the shaft portions 21 of two roller assemblies and the housing portions 10 of the two roller assemblies are non-rotatably supported in a fixed support 2.

Figure 9:
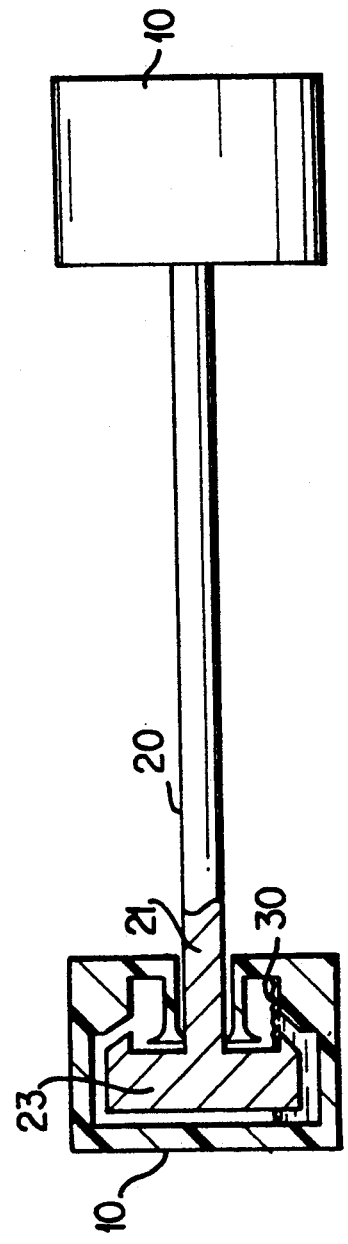
FIG. 9 shows a roller assembly of the present invention used as the axle and wheels for a simple cart or tilt-truck.

FIG. 9 illustrates an embodiment in which two of the roller assemblies of the present invention are connected to one another by single shaft which, in effect, functions as an axle with the housings of the roller assemblies 10 functioning as tires. In such an application, the housing 10 would be formed of or otherwise provided with an outer periphery of a suitable tire type rubber or plastic. As shown in the cutaway of FIG. 9, the roller assembly per se includes a shingle-type construction and a lip seal to avoid any possibility of leakage.

FIG. 10 shows an alternative way of using the roller assemblies of the present invention to support a roll-type conveyor roll 4. In this example, the roll 4 is in the form of a hollow tube. A roller assembly is fit into the opposite ends of the hollow tube as shown in FIG. 10.

In FIG. 10, the roller assemblies are press fit into the ends of the roll or tube 4. The roller assemblies can, however, be secured within the ends of the roll 4 in any known releasible or non-releasible manner including, but not limited to, adhesives, splines, snap-fit, spring-fit, threads, or, as shown in FIG. 10B, serrations. In the specific example shown in FIG. 10B, the roll is formed with serrations at its end such that when the housing portion 10 of the roller assembly is pressed into the end of the roll 4, the serrations tightly grip the outer periphery of the housing portion 10 to secure the roller assembly in the end of the roll 4.

The embodiment of FIG. 10 differs from the embodiment of FIG. 8 in that the housing portion 10 of the roller assembly is directly secured to the rotatable roll 4. Thus, in operation, it is the housing portion 10, not the roller body 23, which rotates with the roll 4. In this embodiment, the roller body and shaft 23, 21 are stationary. To ensure that the roller body 23 and shaft 21 remain stationary, the shaft 21 can be in the form of a hex bar as best shown in the end view of FIG. 10A. The hex bar or shaft 21 is received in a complimentary opening formed in the rails or end supports 2 so that the hex bar or shaft 21 is rigidly secured to the rail. The hex bar 21 extends through a complimentary opening formed in the roller member 23 so that the roller body 2 is rotatably fixed.

The roller body 23 is shown spaced from the inner surface of the housing member 10 for clarity in the drawings. In operation, of course, the housing portion 10 and roller body 23 slide relative to one another. In the specific embodiment shown in FIG. 10, it is the housing portion 10 which moves while the roller body 23 is stationary.

In an embodiment such as that shown in FIG. 10, the housing portion 10 and the roller body 23 contact one another at the top of the roller assembly. This is because gravity pulls the roll 4 and housing portion 10 down onto the roller body 23. Assemblies such as this where contact occurs at the upper end of the roller assembly can experience problems since the lubricant is drawn to the lower portion of the roller assembly by gravity. However, tests have shown that, in this specific application, the rotating plastic housing 10 flings the oil out centrifugally to effect lubrication. This centrifugal effect is primarily achieved because it is the outer housing portion 10 which rotates rather than the roller body member 23. If it was the roller body that was rotating instead, there may not be adequate lubrication.

In this specific construction, it has been found that the best results are achieved when the hex bar or shaft 21 and roller body 23 are formed of a metal such as steel. The roller body 23 may also be formed of plastic or less expensive metal with an outer sleeve of high performance bearing material as in the embodiment of FIG. 12 below. The housing 10 should be formed of a plastic material such DELRIN. The roll for the conveyor may be formed of either metal or plastic as suitable for the intended application.

The assembly shown in FIG. 10 is constructed by first inserting the roller assembly, without the hex bar 21, into the respective ends of the conveyor roll 4. The roll 4 is then aligned with the openings in the rails or supports 2 and the hex bar 21 is inserted through the openings in the rails and in the roller bodies 23 of conveyor roll 4 so as to support the roll 4 on the rails 2.

There are, of course, many types of housing constructions which can be used to facilitate attachment of the housing to a stationary support or, as in the case of the conveyor system of FIG. 10, to a rotating roll. For example, the housing portions could be glued or rigidly secured to the support by a bolt or the like. Some of the convenience of the present invention is lost, however, when additional structures such as bolts or pins or glue are used to secure the housing to a roll or a stationary support. As noted previously, the roller assemblies of the present invention can be used in constructions which require literally hundreds of thousands of such rolls. The assembly expense is dramatically increased if each such roll must be glued or pinned in place. Thus, it is better to have a roller assembly which can be fit into place without the use of additional means.

Figure 11:
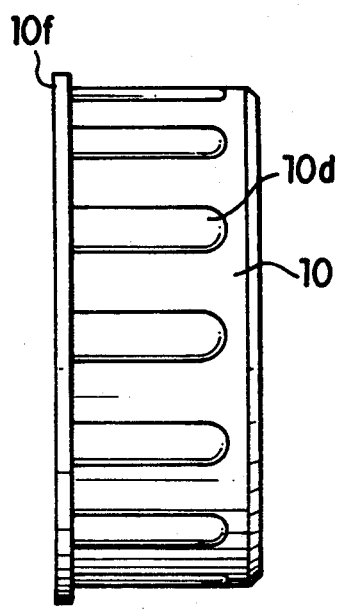
FIG. 11 is a side view of an alternative housing construction having a different type of serrated outer periphery.
Figure 11A:
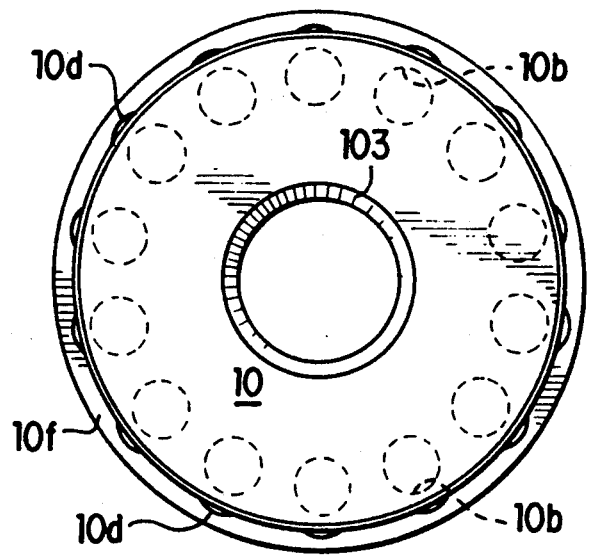
FIG. 11A is an end view of the housing of FIG. 11.
Figure 11B:
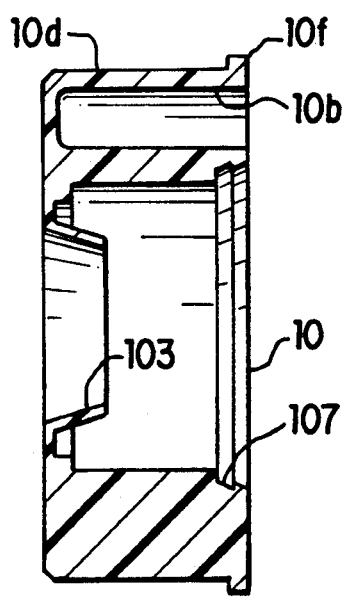
FIG. 11B is a cross-section of the housing of FIG. 11B.
Figure 11C:
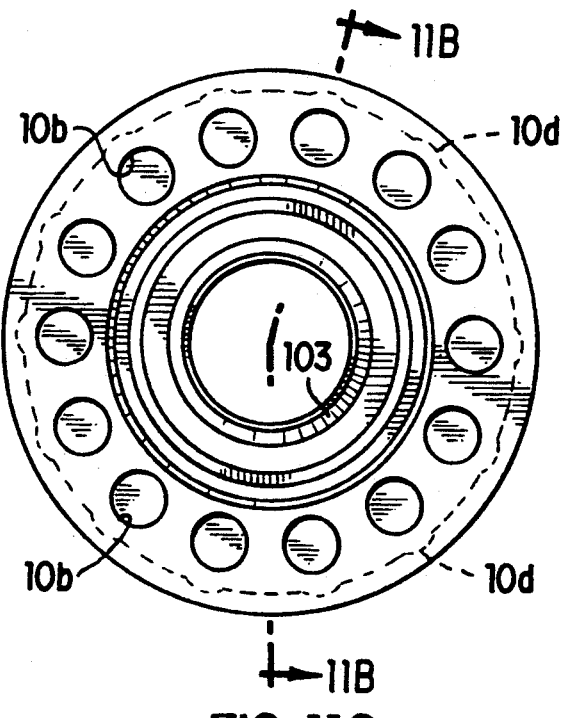
FIG. 11C is another end view of the housing of FIG. 11.

The serrated outer periphery of the housing 10 of the roller assembly shown in FIG. 10B is a simple example of a built-in attachment means. A more sophisticated housing construction is shown in FIGS. 11–11C. As shown in these drawings, the outer periphery of the housing 10 is formed with a circumferentially spaced series of elongated dimples 10d and with an end flange 10f. The end flange 10f is provided such that when the housing is assembled into the end of a roll such as the roll 4 shown in FIG. 10, the housing is maintained at the end of the roll and cannot slide further into the roll. Naturally, an end flange should not be used if it would interfere with inserting the housing into the stationary support as, for instance, if the roller assembly is to be inserted past the edge of the stationary support. In some cases, however, the end flange might be useful in positioning the housing accurately at the edge of the stationary support.

Except for the portion of the housing from which the flange extends, the dimples 10d define the outermost extent of the housing. As best shown in FIGS. 11A, 11B and 11C, the housing 10 is also formed with a series of circumferentially spaced bores 10b which are spaced so as to undercut each of the elongated dimples 10d. By virtue of this arrangement, each of the elongated dimples 10d is flexibly supported on the remainder of the housing such that the dimples 10d can be pressed radially inward. This makes it possible to press fit the housing assembly into a bore having a diameter which is slightly less than the diameter of the housing taken from the outermost extent of the dimples. Once assembled into the bore, the plastic housing 10 tends to bend radially outward to securely hold the housing in place.

The construction shown in FIGS. 11A, 11B and 11C has proven to be easy to assemble into a stationary support or tube or roll of the type shown in FIG. 10. Consequently, it is believed that this type of housing construction is particularly appropriate for high volume applications where many roll assemblies must be assembled into place.

As best shown in FIG. 11B, the housing can have an open end with locking projections 107 adapted to receive an end cover (not shown). The end cover can be a simple cover to seal the housing. Alternatively, the end cover can have a shaft receiving opening and lubricant retaining reservoir similar to the opposite end of the housing such that the shaft can extend through each end of the housing.

Figure 12B:
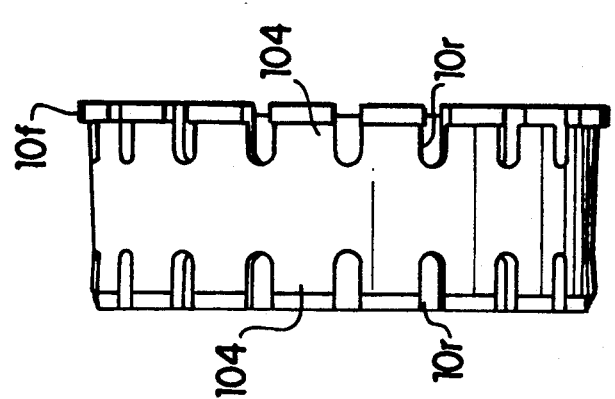
FIG. 12B is a side view of the roller assembly of FIG. 12.
Figure 12A:
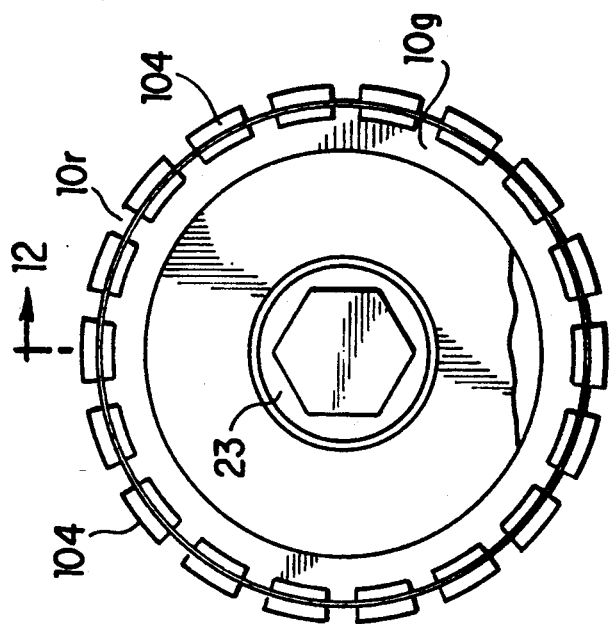
FIG. 12A is an end view of the roller assembly of FIG. 12.
Figure 12:
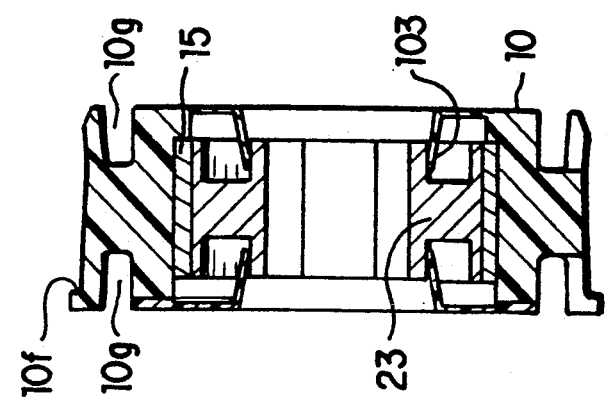
FIG. 12 is a cross-section of a roller assembly having a spring-like outer periphery.

An alternative housing construction is shown in FIGS. 12, 12A and 12B. These drawings show a complete roller assembly which includes a housing portion 10, a roller body 23 having a hex nut opening formed therein and, in accordance with another aspect of the present invention, a sleeve 15 formed of a hardened bearing material such as bearing steel is provided on the outer periphery of the roller body. The remainder of the roller body 23 may be formed of metal or plastic. In this case, the roller assembly is adapted to have the shaft extending through each end. Naturally, the housing configuration could also be used for a housing with one end closed such as that shown in FIG. 1A for example.

In order to provide a flexible outer periphery to the housing, in this embodiment, a facing groove 10g is formed on each end face of the housing 10 proximate the outer periphery of the housing. Additionally, as best shown in FIGS. 12A and 12B, circumferentially spaced radial slots 10r are formed along the edges of the outer periphery of the housing 10 at both ends of the housing. The facing grooves 10g and radial slots 10r, together define circumferentially spaced series of cantilever projections 104. Further, as best shown in FIGS. 12 and 12A, the outer periphery of the housing 10 has a slight taper upward as the housing approaches the axial ends. In this way, the outermost extent of the housing 10 is at the ends of the housing, i.e., the axial ends of the cantilever projections 104. Thus as viewed in FIG. 12, for example, the outer periphery has a slight "U" shape.

Taking all of the above into account, the housing 10 is formed such that the outer periphery is defined at its axial ends by the projections 104. These projections are spring mounted or flexibly mounted to the remainder of the housing such that the housing can be assembled into a tube or stationary support by pressing the housing into the tube, roll or stationary support such that the projections 104 are radially deflected downward to allow the housing to fit securely and snugly into the roll, tube or stationary support. Once inside the bore of the roll, tube or stationary support, the projections 104 spring upward to secure the housing in the support.

Again, it can be seen how by forming the housing in a special manner such that outer periphery is spring biased, the roller assembly is given a self-securing construction. This simplifies assembly of the roller assembly into a conveyor system or other application. As mentioned earlier, this savings in assembly time is greatly multiplied when the roller assembly is used in a conveyor system or some other application requiring hundreds of thousands of roller assemblies.

The roller assemblies of the present invention can be manufactured according to any suitable process. Generally, the manufacture would include the following sequence of steps. First, the necessary plastic pieces are molded and other non-plastic pieces, if used, are formed. Generally, the shape of the pieces, especially the housing, of the present invention allows molding using a simple two-piece or three-piece injection mold or in some cases, blow molding. After molding, the roller body and shaft assembly 20 is located within one housing portion 10A and the second housing portion 10B is fit around the assembly 20 so as to enclose the roller body 23. The housing portions 10A and 10B are then joined by sonic welding or an adhesive or some other suitable means to form a complete roller assembly. Lubricant is then inserted into the assembly through a pre-formed lubricating hole (such as that shown as 10L) or through a cannula inserted through the housing. After the necessary amount of lubricant is inserted the lubricant hole or the hole formed by the cannula is sealed or plugged to insure the fluid integrity of the roller assembly.

An important consideration in manufacturing the roller assemblies of the present invention is the shape and dimensions of the component parts. These dictate the mold types and molding techniques which can be used. Consequently, ease of molding is an important factor in designing a roller assembly according to the present invention. Other important factors are cost, intended use and required durability. With these factors in mind it is believed that there are numerous possible shapes and configurations of roller assemblies which embody the principles of the present invention as described above.

It should be appreciated that the present invention provides numerous advantages over conventional assemblies using rolling bearings. In particular, because of its all plastic lubricated construction, the present invention has a longer life, produces less noise and is less expensive than known roller assemblies. Moreover, because the present invention can be constructed entirely of non-corrosive parts, it is safe for use in sanitary environments such as food processing plants.

The present invention also provides numerous advantages over a dry all plastic system. Because of the provision of lubricant within the roller assembly, there is less noise, and the friction forces are reduced at least two and one half times so as to significantly reduce wear and extend the life of the roller assembly. Moreover, the present invention includes a molded in lip-type seal to prevent any possibility of leakage. The roller assembly can be formed with any engineering plastic. However, it is believed that DELRIN TM is particularly suitable for anticipated uses.

I claim:

1. A sealed roller assembly comprising:
   a shaft and roller body assembly comprising at least one shaft and a roller body secured to the shaft;
   a housing, the housing surrounding the roller body and including an opening for receiving each shaft, the housing including a seal formed integrally therewith in contact with the shaft and roller body assembly to seal the interior of the housing and the housing including an inner cylindrical contact surface on which the roller body is adapted to roll;
   a predetermined amount of lubricant located within the housing for lubricating the contact surface of the interior of the housing; and
   a fluid containment reservoir provided such that when the roller assembly is displaced from the horizontal position to a position in which lubricant flows toward the shaft receiving opening the lubricant flows into and is contained within the containment reservoir.

2. The roller assembly of claim 1, wherein the fluid containment reservoir is formed in an end wall of the housing adjacent to the shaft receiving opening.

3. The roller assembly of claim 1, wherein the housing further comprises a sleeve extending axially inward of the shaft receiving opening, the sleeve surrounding the shaft so as to define an annular lubricant containment reservoir bounded by the outer periphery of the sleeve and the interior of the housing.

4. The roller assembly of claim 3, further comprising a lip seal formed on the axial sleeve.

5. The roller assembly of claim 1, wherein the shaft is integrally formed with the roller body.

6. The roller assembly of claim 1, wherein the shaft is formed separately from the roller body and secured thereto.

7. The roller assembly of claim 6, wherein the shaft is secured to the roller body by a releasable connector.

8. The roller assembly of claim 6, wherein the shaft is secured to the roller body by a snap-type connector.

9. The roller assembly of claim 1, wherein the roller body includes an annular protrusion terminating in a drip edge and wherein the axial sleeve of the housing extends axially under the drip edge and is inclined upwardly such that lubricant sliding off the drip edge is directed into the lubricant containment reservoir.

10. The roller assembly of claim wherein the roller assembly is constructed entirely of non-metallic components.

11. The sealed roller assembly of claim 1, wherein the housing includes an outer periphery having a plurality of spaced protrusions formed therein, each of the protrusions being undercut so that the protrusions can be deflected radially inward to facilitate insertion of the housing into a bore.

12. The sealed roller assembly of claim 1, wherein the housing has a generally cylindrical periphery and the protrusions comprise elongated dimples extending radially outward from the cylindrical surface and further comprising bores formed in the housing under each of the dimples so as to undercut the dimples.

13. The sealed roller assembly of claim wherein the protrusions comprise spaced cantilever projections, each cantilever projection having an end supported by the housing and an unsupported end and a radially outer most portion at the unsupported end of the cantilever projection, the radially outermost portion being supported for deflection radially inward to permit the housing to be inserted into a bore.

14. The sealed roller assembly of claim 1, wherein the housing has a serrated outer periphery.

15. The sealed roller assembly of claim wherein the housing has an outer periphery comprising a plurality of projections spring mounted for deflection radially inward to facilitate insertion of the housing into a bore.

16. A sealed roller assembly comprising:
   a housing, the housing having a cylindrical interior surface portion and at least one shaft receiving opening formed therein, the housing further comprising a seal integrally formed with the housing;
   a shaft and roller body assembly comprising a roller body located within the housing and adapted to roll against the cylindrical interior surface portion of the housing and at least one shaft extending into the housing through the shaft receiving opening and rotatably secured to the roller body, the seal being in sliding contact with the shaft and roller body assembly at a sealing point;
   a predetermined supply of lubricant contained within the housing; and
   a lubricant containment reservoir formed in at least one of the shaft and the housing, the lubricant containment reservoir designed to contain lubricant such that regardless of the orientation of the roller assembly, lubricant does not collect at the sealing point.

17. The roller of claim 16, wherein the housing further comprises a sleeve extending axially inward of the shaft receiving opening and terminating in the seal contacting the shaft and the roller body assembly, the outer periphery of the sleeve together with a portion of the housing walls defining an annular lubricant containment reservoir.

18. The roller assembly of claim 17, further comprising an annular protrusion formed on the roller body to direct lubricant into the lubricant containment reservoir and away from the interface between the shaft and the axial sleeve.

19. The roller assembly of claim 16, wherein the shaft is formed separately from the roller body.

20. The roller assembly of claim 16, wherein the shaft is formed integrally with the roller body.

21. The roller assembly of claim 16, wherein the roller assembly is formed entirely of non-metallic components.

22. The roller assembly of claim 16, wherein the lubricant containment reservoir is formed in the housing.

23. The roller assembly of claim 16, wherein the lubricant containment reservoir is formed in the shaft.

24. The sealed roller assembly of claim 16, wherein the housing includes an outer periphery having a plurality of spaced protrusions formed therein, each of the protrusions being undercut so that the protrusions can be deflected radially inward to facilitate insertion of the housing into a bore.

25. The sealed roller assembly of claim 16, wherein the housing has a generally cylindrical periphery and the protrusions comprise elongated dimples extending radially outward from the cylindrical surface and further comprising bores formed in the housing under each of the dimples so as to undercut the dimples.

26. The sealed roller assembly of claim 16, wherein the protrusions comprise spaced cantilever projections, each cantilever projection having an end supported by the housing and an unsupported end and a radially outer most portion at the unsupported end of the cantilever projection, the radially outermost portion being supported for deflection radially inward to permit the housing to be inserted into a bore.

27. The sealed roller assembly of claim 16, wherein the housing has a serrated outer periphery.

28. The sealed roller assembly of claim 16, wherein the housing has an outer periphery comprising a plurality of projections spring mounted for deflection radially inward to facilitate insertion of the housing into a bore.

29. A conveyor assembly comprising:
a pair of spaced stationary supports;
a plurality of shafts extending between the spaced stationary supports; and
a conveyor roll rotatably supported on each of the plurality of shafts;
each of the conveyor rolls being supported on the shafts by a plurality of roller assemblies, each roller assembly comprising: a roller body rotatably secured to the shaft; a housing, the housing surrounding the roller body and the shaft, the housing including an outer peripheral surface secured to the conveyor roll and an inner cylindrical contact surface which is adapted to roll on the cylindrical outer peripheral surface of the roller body; a predetermined amount of lubricant located within the housing for lubricating the contact surface of the interior of the housing; and a fluid containment reservoir provided such that when the roller assembly is displaced from the horizontal position to a position in which lubricant flows towards the shaft receiving opening, the lubricant flows into and is contained within the containment reservoir.

30. The conveyor assembly of claim 29, wherein the roller body is formed of metal.

31. The conveyor assembly of claim 29, wherein the shaft has a non-cylindrical shape.

32. The conveyor assembly of claim 29, wherein the housing portion is formed of a plastic material.

* * * * *